US012234972B1

(12) United States Patent
Ketterer et al.

(10) Patent No.: US 12,234,972 B1
(45) Date of Patent: Feb. 25, 2025

(54) LIGHT STAND

(71) Applicant: LuxTech, LLC, Ballwin, MO (US)

(72) Inventors: Benjamin Daniel Ketterer, Ballwin, MO (US); Rebecca Renei Ketterer, Ballwin, MO (US)

(73) Assignee: LuxTech, LLC, Ballwin, MO (US)

( * ) Notice: Subject to any disclaimer, the term of this patent is extended or adjusted under 35 U.S.C. 154(b) by 0 days.

(21) Appl. No.: 18/531,356

(22) Filed: Dec. 6, 2023

Related U.S. Application Data

(60) Provisional application No. 63/431,358, filed on Dec. 9, 2022.

(51) Int. Cl.

| | |
|---|---|
| ***F21V 21/06*** | (2006.01) |
| ***F21S 6/00*** | (2006.01) |
| ***F21V 21/40*** | (2006.01) |
| ***F21V 23/00*** | (2015.01) |
| ***F21V 23/02*** | (2006.01) |
| ***F21V 23/06*** | (2006.01) |
| ***F21W 131/10*** | (2006.01) |

(52) U.S. Cl.
CPC .............. *F21V 21/06* (2013.01); *F21S 6/006* (2013.01); *F21V 21/40* (2013.01); *F21V 23/002* (2013.01); *F21V 23/02* (2013.01); *F21V 23/06* (2013.01); *F21W 2131/1005* (2013.01)

(58) Field of Classification Search
CPC ........ F21V 21/06; F21V 21/40; F21V 23/002; F21V 23/02; F21V 23/06; F21S 6/006; F21W 2131/1005
See application file for complete search history.

(56) References Cited

U.S. PATENT DOCUMENTS

| | | | | |
|---|---|---|---|---|
| 1,492,427 | A | 4/1923 | Cioll | |
| D345,026 | S | 3/1994 | Pottebaum | |
| 5,428,520 | A | 6/1995 | Skief | |
| 5,688,195 | A | 11/1997 | Caso | |
| D436,204 | S | 1/2001 | Leen | |
| 6,213,626 | B1 * | 4/2001 | Qian | F21V 21/06 362/418 |
| D441,491 | S | 5/2001 | Leen | |
| 6,554,459 | B2 | 4/2003 | Yu et al. | |

(Continued)

OTHER PUBLICATIONS

Wobblelight [online]. Southwire, Nov. 13, 2023. Retrieved from the Internet <URL: https://www.southwire.com/lighting/area-lights/15-000-lumen-32-led-wobblelight-1/p/111303LED>.

*Primary Examiner* — Mary Ellen Bowman
(74) *Attorney, Agent, or Firm* — Carmody MacDonald P.C.; Kevin C. Staed; Dennis Jm Donahue, III

(57) ABSTRACT

The light stand includes a frame having a offset base with upper and lower legs that to allow for the nesting of adjacent light stands for more compact transport and storage. The light stand includes a dual-mast design with a top beam that allows a light fixture to be connected thereto. So that the light stand can be readily used in inclement weather and to protected the light fixture from knocking damage if it were to fall over or be accidently hit, the preferred embodiment of the light fixture includes a socket assembly with a flange having an elongated sidewall such that the fastening portion of the bulb extends into the flange of the socket and is protected from the elements. The light stand also includes an outlet to provide power to other lights or items used therewith.

20 Claims, 10 Drawing Sheets

(56) References Cited

U.S. PATENT DOCUMENTS

| | | | | |
|---|---|---|---|---|
| 6,824,297 | B1 * | 11/2004 | Lee | F21V 21/116 362/399 |
| 7,387,412 | B2 | 6/2008 | Tsai | |
| 10,690,304 | B2 | 6/2020 | Adams et al. | |
| D894,475 | S | 8/2020 | Keevy et al. | |
| 2001/0036077 | A1 * | 11/2001 | Buss | F21V 21/06 362/418 |
| 2002/0126492 | A1 * | 9/2002 | Ching | F16M 11/28 362/419 |

* cited by examiner

LIGHT STAND

CROSS-REFERENCE TO RELATED APPLICATIONS

This application claims priority from U.S. Provisional Patent Application No. 63/431,358 filed Dec. 9, 2022, which is incorporated by reference herein.

STATEMENT REGARDING FEDERALLY SPONSORED RESEARCH

Not Applicable.

APPENDIX

Not Applicable.

BACKGROUND OF THE INVENTION

Field of the Invention

The present invention relates to a light stand, and more particularly to a portable light stand for construction zones.

Related Art

Construction lights have long been used to temporarily illuminate spaces that are in various stages of completion. For longer term projects, temporary lighting may be installed within the construction zone and remain in place through completion. However, often times portable lighting is used for smaller projects and may also be used in combination with more permanent construction lights. Thus, there is a desire to those in the art to provide quickly deployable, portable and durable light stands which can be used in an area for a period of time, moved around a space and subsequently stowed when no longer needed. Because these light stands are not permanent and are routinely moved from place to place, it is a particular desire to provide an easy means for storing and transporting the light stands between jobs while taking up as little space as possible.

Examples of various light stands in the prior art include those described in U.S. Pat. No. 10,690,304 by Adams et al., U.S. Pat. No. 7,387,412 by Tsaia and US Design Patent No. D441,491 by Leen which each describe portable light stands that are usable within a construction setting. For example, the '412 Patent describes a tripod light stand design that has a small footprint and therefore takes up less room in the construction zone and during storage. However, this light stand requires multiple adjustments to the base and center post and therefore requires additional setup and takedown time.

Alternatively, the '412 Patent and the '491 Patent are directed to relatively simple light stands that do not require substantial adjustments for step and takedown but which do not readily store in a nested fashion for easy transport. Similarly, the WOBBLELIGHT® by SOUTHWIRE® is a more complex but durable light stand that self-rights when bumped or knocked but cannot be readily stored in a compact fashion. Accordingly, there remains a desire to those in the art to provide to provide an improved light stand that is not only free of adjustments that lengthen setup and take down times but which is also easily stow in a nested fashion for easy transport.

Limited functionality is also a common issue in prior art lights. Although many devices may effectively provide light in remote areas with limited access to power as discussed above, these devices are single function and do no otherwise assist workers in construction zones who may be in need of additional power or storage. For example, another problem in construction zones is the generally limited access to grid power. Individuals traditionally use battery operated lights and tools, run lengthy extension cords across great distances for the nearest accessible outlet or carry heavy portable generators to particular locations within a construction zone where power is necessary. Further still, workers in remote areas of construction zones are removed from their workbench and tool storage, requiring them to carry necessary tools and work items on tool belts or move separate workbenches or storage racks to the remote area in which they are working. Accordingly, in addition to providing temporary light in particular areas of a construction zone as needed, there is also a desire to provide more accessible power supply within a multifunctional device not only capable of illuminating a space but also providing additional access to power as well as providing remote storage.

SUMMARY OF THE INVENTION

The light stand according to the invention described herein is made from a light weight frame having an innovative offset base. The base includes mirrored upper and lower sections that are vertically offset from one another to allow for nesting of adjacent light stands for more compact transport and storage. The light stand also includes a dual-mast design with a top beam that allows a light fixture to be connected thereto while also providing a handle for easy carrying. One or both of the masts may also include a hook for cable storage or for hanging various other items as well as an outlet for allowing the stand to be a multifunctional tool that not only illuminates a given area but provides additional power for plugging in other tools or lights.

The base of the stand includes legs positioned on opposite sides of the masts with one leg substantially within an upper plane and the other leg substantially within a lower plane. A foot extends from the leg within the upper plane so that the stand can remain level when positioned on the ground. When the stand is not in use, the offset base design allows multiple stands to be nested together with the top leg of one stand overlapping the bottom leg of an adjacent stand.

So the light stand can be readily used in inclement weather and to further protect the light socket assembly and bulb from damage, the light socket includes a flange with an elongated sidewall that protects the light socket and at least a portion of the bulb. The fastening portion of the bulb extends into the socket that is surrounded by the flange and sidewall such that the socket protected from the elements and external forces. In the preferred embodiment, the light fixture assembly is suspended from the top beam and is therefore further protected from the elements by the roof of the fixture and the external flange and sidewalls which prevent water from entering the socket. For example, rain dropping onto the roof of the suspended fixture may run down along the sidewall of the flange without seeping into the socket.

In addition to providing light to a given area, the stand includes an outlet within at least one of the masts so that an individual using stand can power items proximate thereto or plug other light stands in to daisy chain them together to provide additional light. The outlet includes a receptable box that is connected or integrated into one of the masts and is in electrical communication with the power supply and fixture via internal wiring that extends through cable passageways within the frame.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1B:
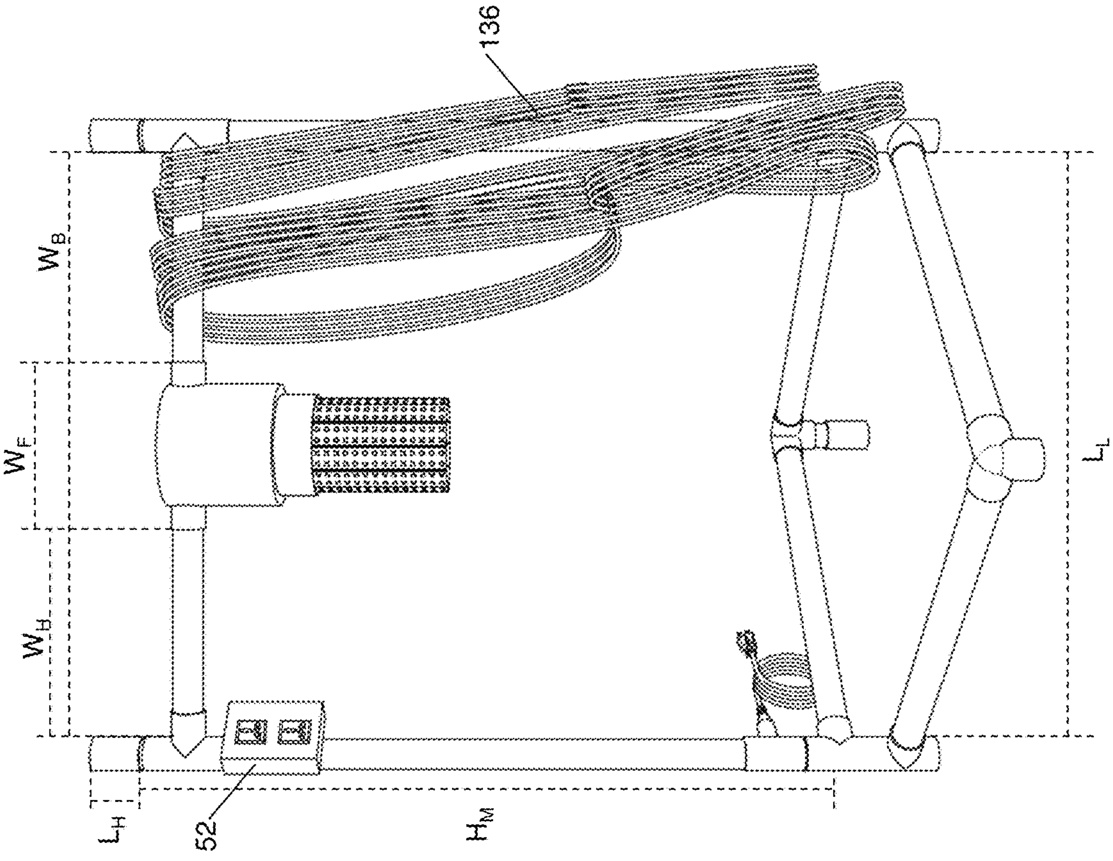
FIGS. 1A-1D show the light stand according to the preferred embodiment of the invention described herein.

The following description of the preferred embodiment(s) is merely exemplary in nature and is in no way intended to limit the invention, its application, or uses.

The light stand described herein includes a base which supports a frame holding a light fixture and is intended to be used in a construction zone setting to provide temporary lighting to a given area. However, it will be appreciated that the stand could be used in any number of situations. The stand in the preferred embodiment described herein is also multifunctional, serving as a temporary light in addition to an extended power supply and storage rack. Furthermore, when not in use, the stand is designed to nest with adjacent stands in a compact configuration so as to take up as little space as possible during storage or transport.

The light stand 10 includes base 12 of the stand includes a pair of legs 18 and 20 which horizontally protrude on opposite sides of the frame to support the light fixture held thereon. In the preferred embodiment of the stand shown in FIG. 1, each leg includes opposing ends 22*a*, 22*b*, 24*a* and 24*b* that respectively connect to each mast at corresponding leg mount locations 46*a*, 46*b*, 48*a* and 48*b* with the opposing ends spaced by a length (LL) that is equal to the distance between the masts. Furthermore, the connecting points of the respective leg ends on each mast are vertically spaced ($D_1$, $D_2$). In the alternative embodiment of the base particularly shown in FIGS. 7A and 7B, each leg has one fixed end 22*a*' and 24*a*' connected to one of the masts at corresponding locations 46' and 48' while the other ends 22*b*' and 24*b*' are free, disconnected from either masts but spaced by the leg length ($L_{L'}$).

The legs have an offset construction with at least a portion 26 of one leg within a first upper plane 28 and at least a portion 30 of the other leg positioned in a second lower plane 32. The planes are vertically spaced an offset height (Hoff) as shown in FIG. 2A from one another which allows multiple stands to nest together without any interference between the bases as further described below.

Figure 2A:
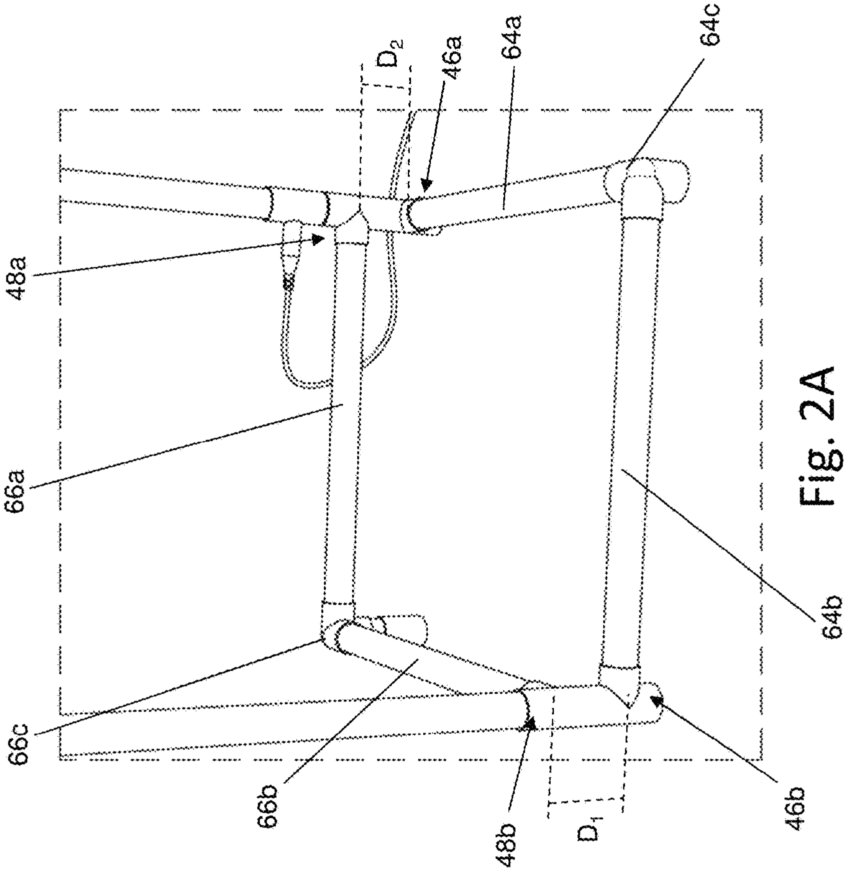
FIGS. 2A and 2B show detail views of the base of the light stand according to the preferred embodiment of the invention described herein.

As particularly shown in the detail view of FIG. 2A, the legs according to the preferred embodiment are orthogonal with each leg having two sections 64*a*, 64*b*, 66*a* and 66*b* that are connected by a bend 64*c* and 66*c*. The first sections of each leg extends between one of the ends connected to at one of the leg mounting locations to the bend and the second section extends from the bend to the other end of the leg connected to another of the leg mounting locations. In combination, the legs of the base form a square shape with the opposing masts being spaced by a distance equal to the diagonal of the square such that the mast is supported equally on both sides. Alternatively, the leg sections may be non-orthogonal with the sections being different lengths. Further still, the shape of the legs may by rounded to collectively form a circle with each leg forming a semicircle on opposing sides of the stands whose diameter connects the opposing masts.

Figure 1A:
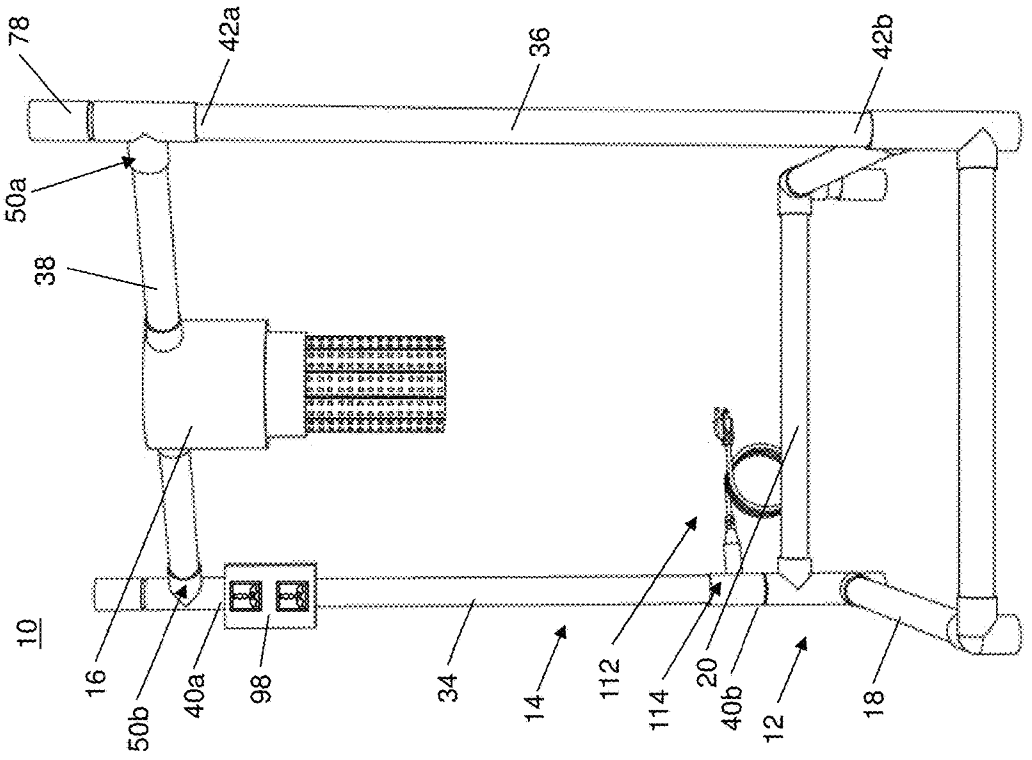
Figures 1C, 1D:
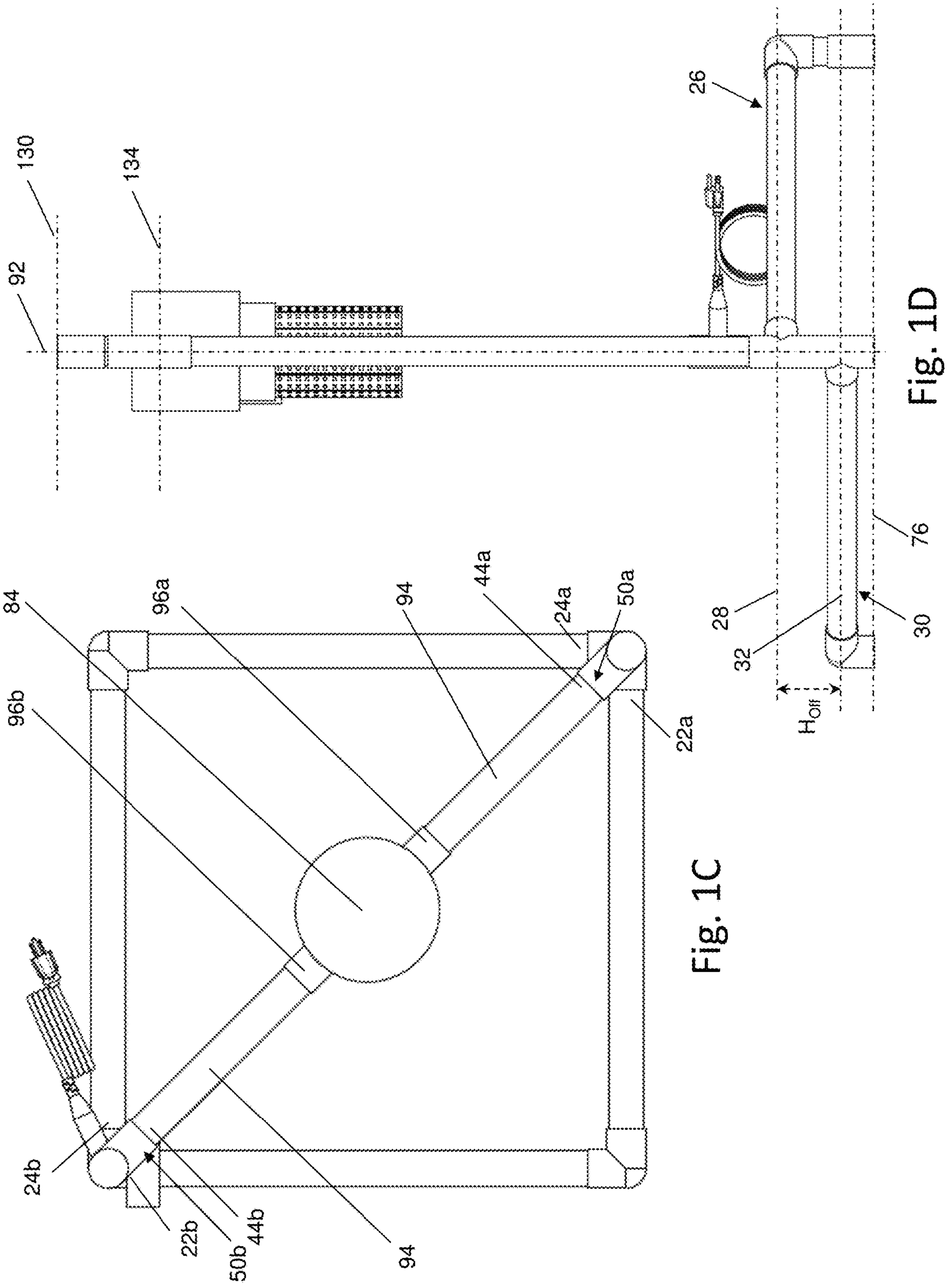

Regardless of the particular shape of the legs, in the preferred embodiment with the ends of each leg connecting to the opposing masts, each leg remains proximal to one of the upper and lower planes and does not angle towards the plane such that one leg is substantially within the upper plane and the other leg is substantially within the lower plane, vertically offset from one another by the offset height of the planes. As shown in FIGS. 1A, 1B and 1D, this offset is provided by the vertical distance (Dv) between the respective mounting locations on the mast for each of end of the legs.

Figure 2B:
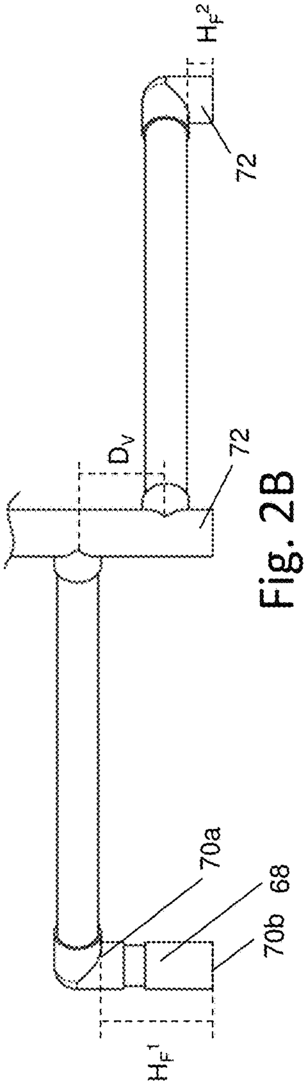

Given one of the leg is higher than the other leg and the upper leg would not contact the ground when the stand is placed on a flat surface, such as the floor, stability is provided to the stand by a foot 68 protruding from the leg that is substantially within the upper plane. As particularly shown in FIG. 2B, the foot protrudes a foot height ($H_F^1$) from a fixed end 70*a* that is connected to the leg to a free end 70*b* beneath the leg. The height of the foot is sized to be at least as great as the offset height between the planes ($H_F^1 \geq H_{Off}$) and legs situated therein so that the free end of the foot rests on the ground, opposite from the leg in the lower plane to provide support on both side of the stand while still allowing multiple stands to nest together as further detailed below.

In addition to the foot protruding from the leg within the upper plane, embodiments of the invention may also have other feet 72 protruding from the bottom end of each mast as well as from the bottoms side of the leg situated in the lower plane. When additional feet are provided, both legs are raised from the ground with the stand sitting on the respective bottom end of each foot that are within a third plane 76 that is coplanar with the floor. The height of these additional feet are not intended to be limiting but it will be understood that height of the feet extending from the leg within the lower plane and the bottom ends of the masts ($H_F^2$) are less than the feet extending from the leg substantially within the upper plane ($H_F^1 > H_F^2$) so that the bottom end of each foot are aligned within the third plane and the stand can be level.

The frame 14 is supported by the base and includes a pair of opposing masts 34 and 36 that are spaced by a beam 38. Each mast includes a top end 40*a* and 42*a* and a bottom end 40*b* and 42*b* that are vertically spaced by the height of the mast (HM). As discussed above, the ends of the legs of the base are connected proximate to the bottom end of the respective masts at their corresponding mounting locations. Opposite from the base, opposing ends 44*a* and 44*b* of the beam connect to the opposing masts at locations 50*a* and 50*b* proximate to their respective top ends. Accordingly, the masts are spaced by the beam width ($W_B$) which corresponds with the distance between the ends of the legs according to the preferred embodiment. The masts and beam are thereby situated within a vertical plane 92 that is orthogonal to the first and second plane and the light fixture is fastened to the beam, at least partially positioned within the vertical plane.

Figure 3B:
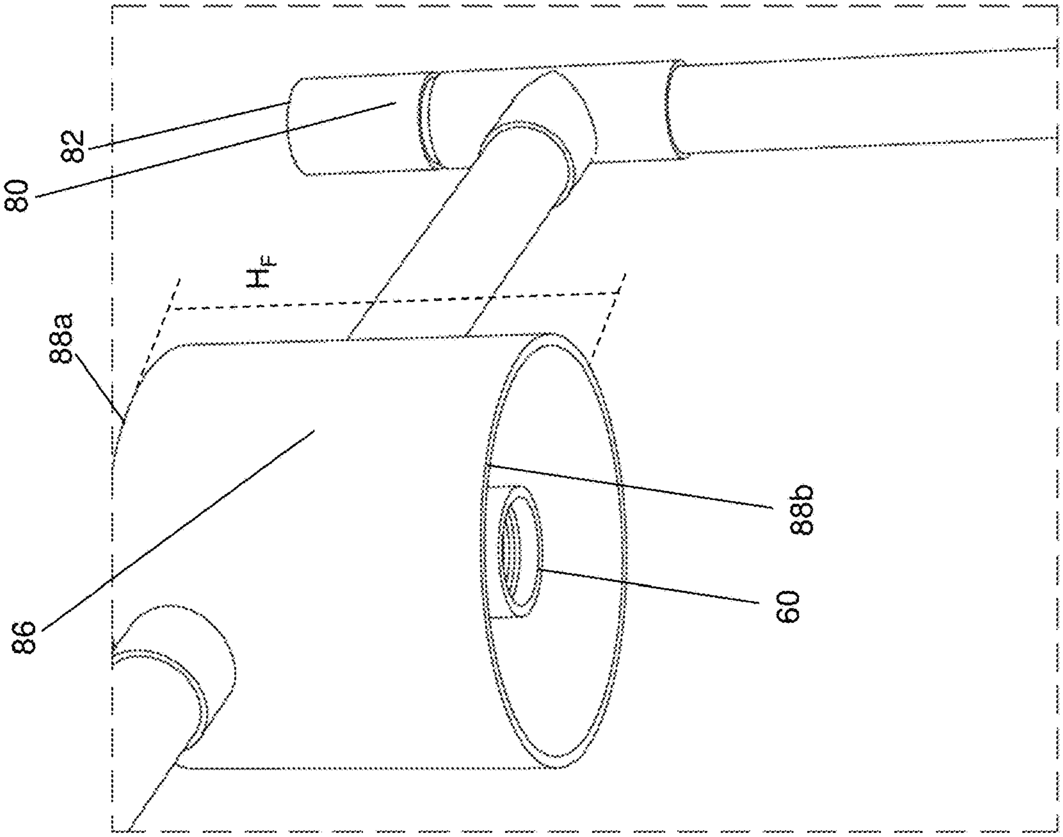
FIGS. 3A and 3B show detail views of the light fixture according to the preferred embodiment of the invention described herein.

The light fixture 16 is connected to the beam and thereby supported by the base and masts. The fixture includes a housing 58 fixedly connected to the beam, a socket 60 within the housing and a bulb 62 that is releasable received within the socket. As particularly shown in FIGS. 3A and 3B, the housing includes top 84 with an external flange 86 extending from a periphery 90 of the top that surrounds the socket and at least a portion of the bulb 74 received therein. The flange includes a proximal edge 88*a* proximate to the beam and a distal edge 88*b* spaced a flange height ($H_F$) from the proximal edge. The top of the housing also includes opposing ends 96*a* and 96*b* spaced by a fixture width ($W_F$) that respectively connect between ends of the beam. Accordingly, the fixture width is less than the beam width ($W_F<W_B$). Furthermore, with the fixture mounted to the beam, at least a portion of the bulb received therein is situated within the vertical plane through which the masts and beam extend.

Figure 3A:
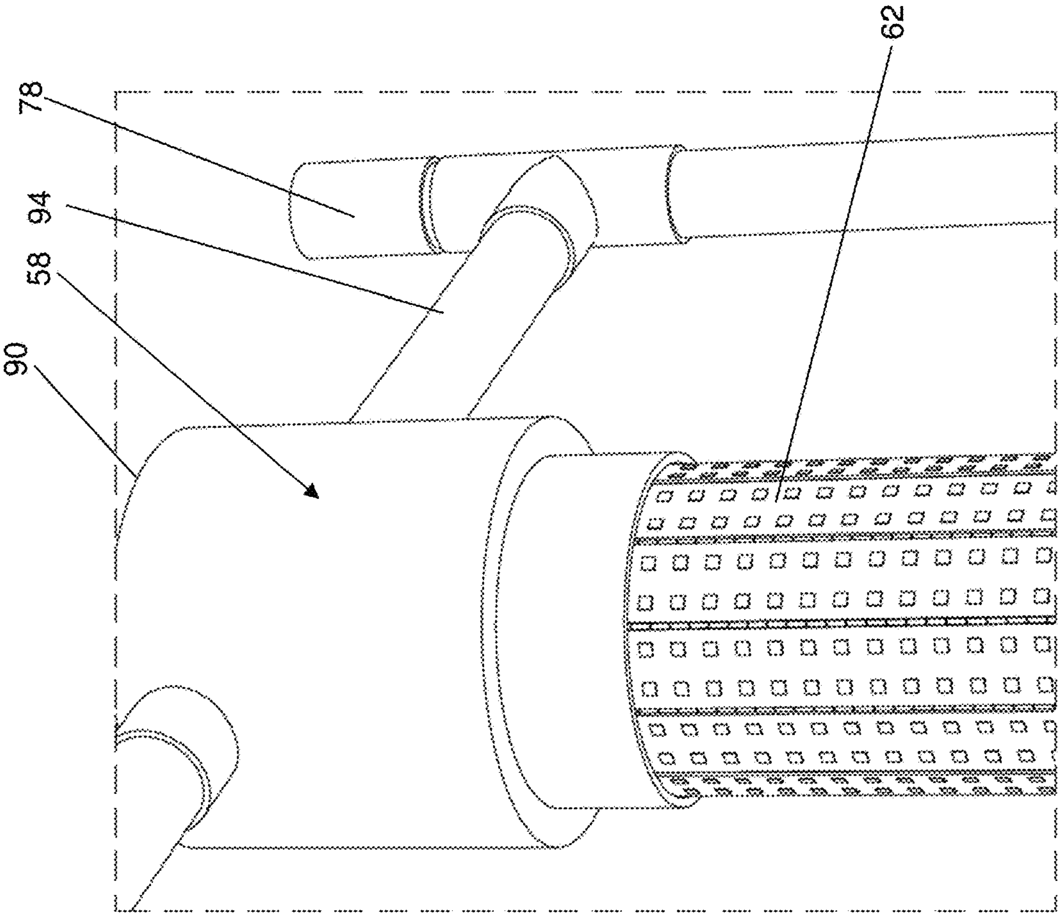

The bulb is received within the socket and as shown in FIG. 3A, the distal edge of the socket covers at least a portion of the bulb. With the flange covering a portion of the bulb, water cannot seep into the socket of the lighting assembly or onto the threaded portion of the bulb received therein when the bulb is suspended beneath the beam as shown in the preferred embodiment of FIG. 3. Furthermore, the external flange protects the socket in the event that the light stand is knocked over or accidentally hit during use.

Figure 5:
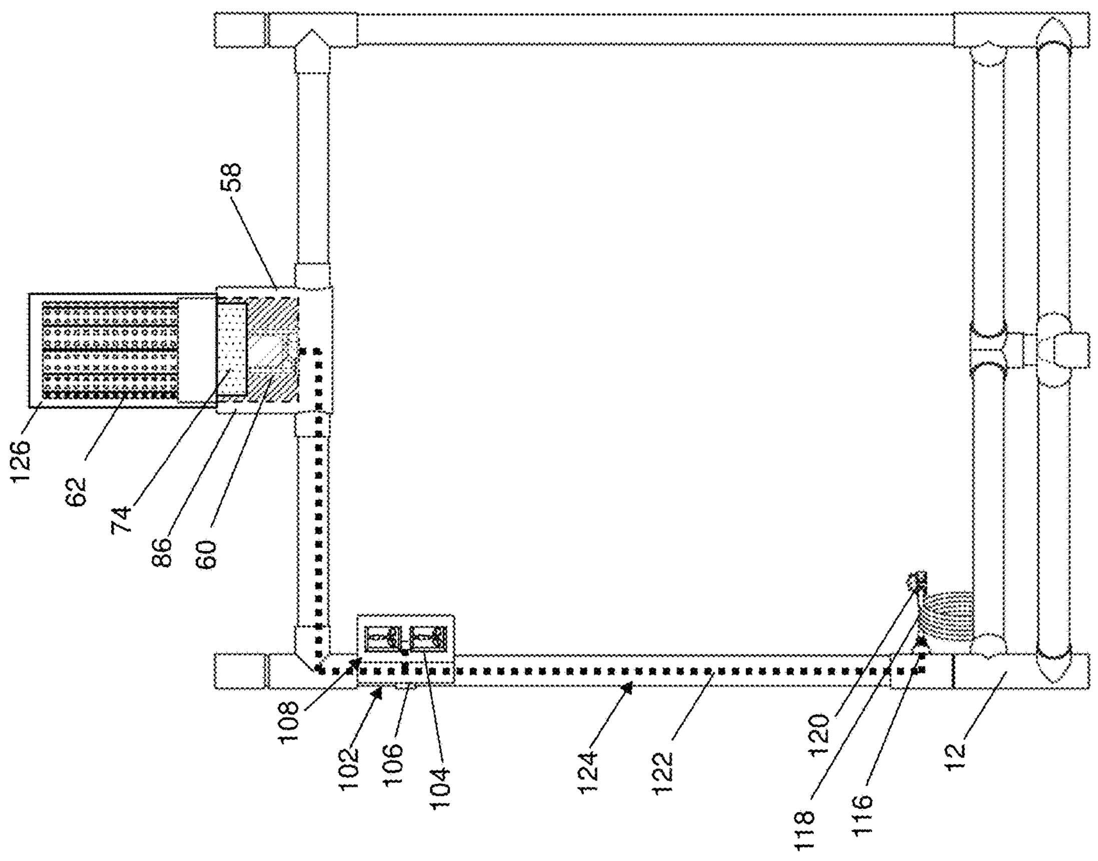
FIG. 5 shows the light stand described herein with an upright light fixture according to an alternative embodiment of the invention described herein.

In the alternative embodiment of the fixture shown in FIG. 5, the bulb is oriented upward rather than suspended beneath the top beam as described above. Although this design may be more susceptible to water damage as the socket is pointed upwards, the external flange still protects the socket and threaded portion of the bulb from damage if it is knocked or toppled over. Furthermore, a lens 126 is preferably provided around the bulb in this embodiment to prevent water from entering the socket. As shown in FIG. 5, the lens is seated between the bulb and the distal edge of the flange to direct water on the outside of the housing rather than towards the socket within the housing.

Regardless of the light fixture orientation, the electrical connections for operating and powering the light fixture are situated within the housing and electrically connect to the socket assembly to power the bulb when it is inserted therein and the fixture is turned on. The preferred fixture includes electrical cables that connect to a home power grid or local generator which allow for quick plugin and operation. As explained below, the preferred tubular frame provides cable passageways with internal wires can routed from the light fixture connected to the top beam through the tubular sections and to an external port within one of the masts. Alternatively, a power cable can be routed directly to the light fixture on the outside of the stand.

In addition to illuminating the surrounding area, the light stand described herein is also intended to be multifunctional and therefore includes a power outlet 98 within one of the masts that allow users to plug in and power other devices as well as link multiple light stands together in a daisy chain without necessarily running multiple extension cords to power each individual light. The outlet is housed within a receptable box 52 positioned within one of the masts. The box includes a body 102 with an outer perimeter 106 surrounding an opening 108 to an interior volume 104 in which the outlet sits. The body is connected to or integrated with the mast at a location 110 and as with the light fixture described above, internal wiring runs to the receptable through cable passageways within the mast to power the outlet.

To power the light fixture and outlet, as well as additional items that may be plugged into the outlet, a power supply 112 is positioned within one of the masts and includes an inlet 114 and a power cord 118 with an external plug 120 protruding from an inlet aperture 116 and an internal wire 122 that extends through the cable passageway 124 within the mast and beam to the outlet and fixture as discussed above. In operation, the user can plug the power cord into a proximate power source, such as grid power, a generator, solar power unit or any other power supply to power the light fixture and outlet within the stand. As discussed above, additional items can also be plugged into the outlet within the mast and the light stand thereby provides light to a given area but also acts as an extension cord to power other items.

To provide further functionality to the light stand beyond illuminating and powering the surrounding space, hooks 78 may be provided on the ends of the mast. As shown in FIG. 1D, the preferred hook includes a neck 80 that extends a length ($L_H$) from the top end of the mast to a nose 82, preferably positioned in another plane 130 above the plane in which the beam sits 134. In addition, one or more hooks may also be located on the length of the mast in replace of or addition to the hook on the top end according to the preferred embodiment shown in the drawings. Users can then use the hooks to hang various items 136 including but not limited to extensions cords and tool carriers that are routinely used in construction settings.

Figure 4A:
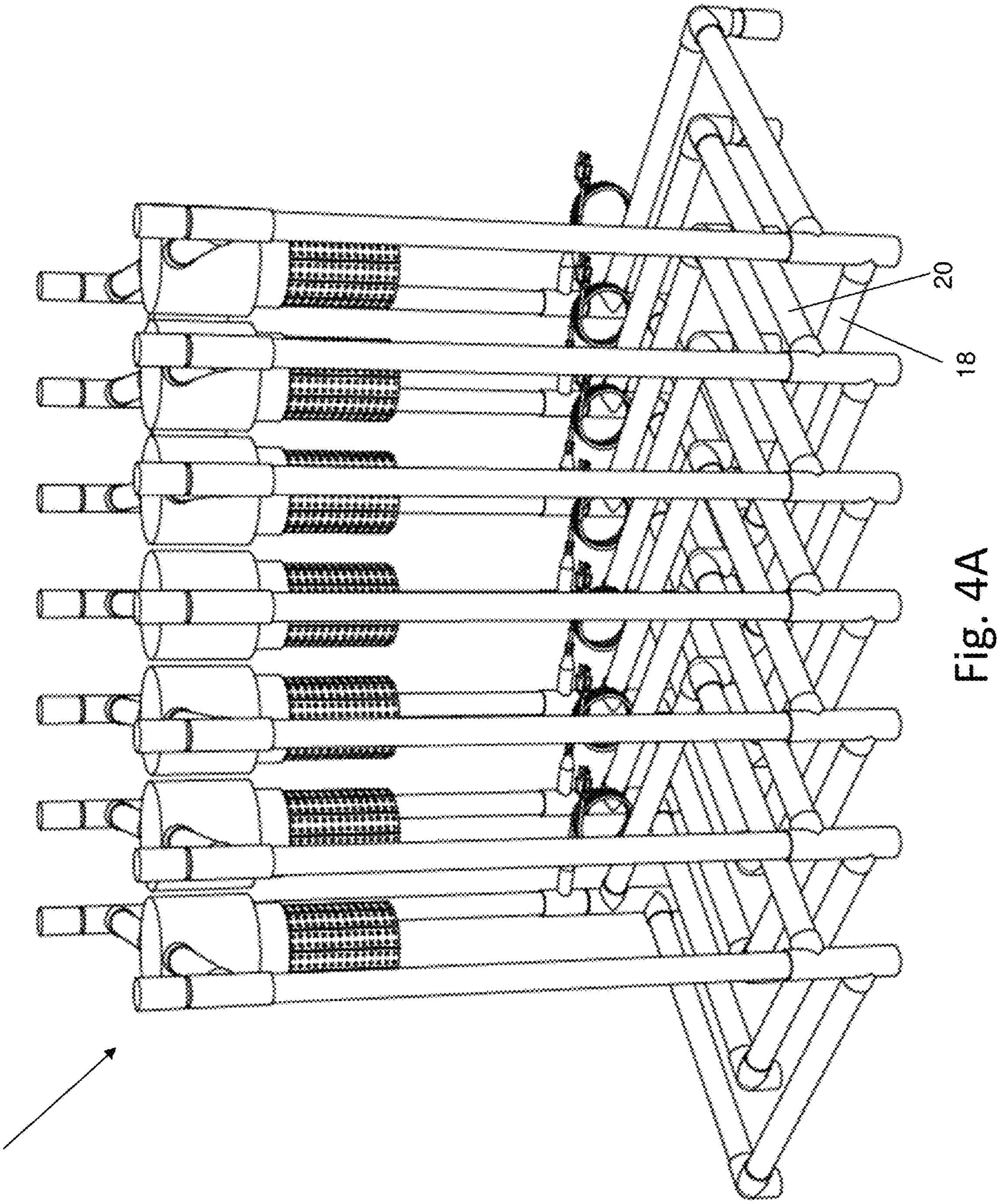
FIGS. 4A and 4B show multiple light stands in a nested configuration according to the preferred embodiment of the invention described herein.
Figure 4B:
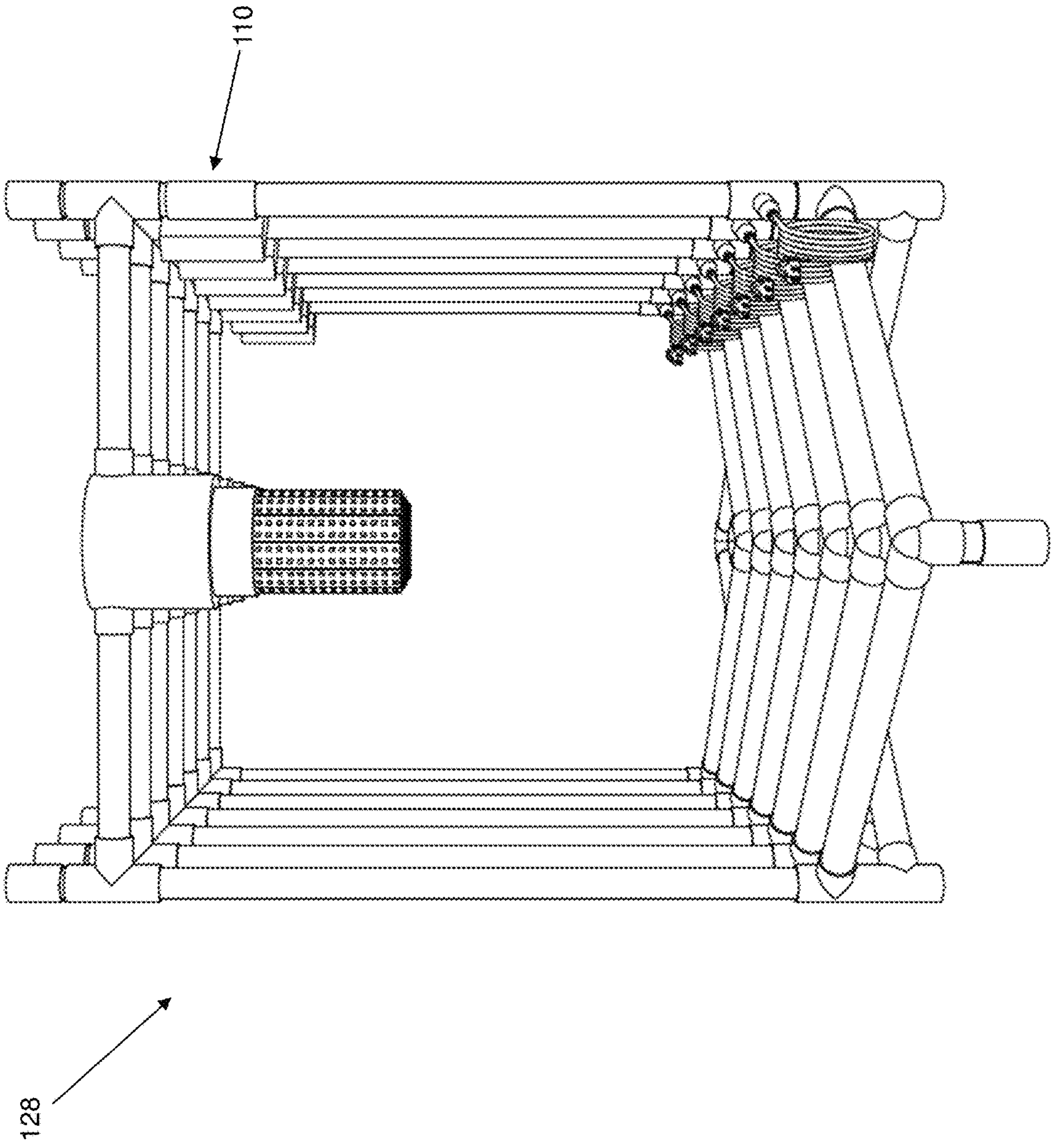

As shown in FIGS. 4A and 4B, another a primary innovative feature of the light stand is its ability to nest together with adjacent light stands for stowage and transport. When stowed in the nested configuration 128, the lower section the base of one light stands is received within the space between the ground and the bottom side of the upper section of the base of an adjacent light stand. When nested, the frame and light fixtures of the respective stands are proximate to one another, but the collection of stands take up less room than they would if they were situated next to one another because their respective footprints overlap. When needed, a user can quickly grab the first stand from the nested group and bring it to the desired location.

A handle 94 is also provided for easily gripping and moving the light stand from location to location. The handle is location on the beam between one of the beam ends and the ends of the housing supported on the beam. The handle thereby includes a handle width ($W_H$) between the end of the beam and the corresponding end of the housing and is at least as great as the width of the fixture. ($W_H \geq W_F$). In the embodiments shown in the drawings it will be understood that the fixture is centered on the beam and the stand has two handle portions on opposite sides of the fixture. However, alternative embodiments may offset the fixture such that there is only one handle on the beam with the fixture being too close to the end of the beam to provide a second handle.

Alternative embodiments more suited for remote work environments may include a battery system that allows the light fixture to illuminate a surrounding area without a direct power supply for a period of time. Furthermore, it will be appreciated the particular bulb is not intending to be limiting and any number of bulb types may be used in the invention described herein without departing from the inventive structure of the base, frame and fixture.

Figure 6B:
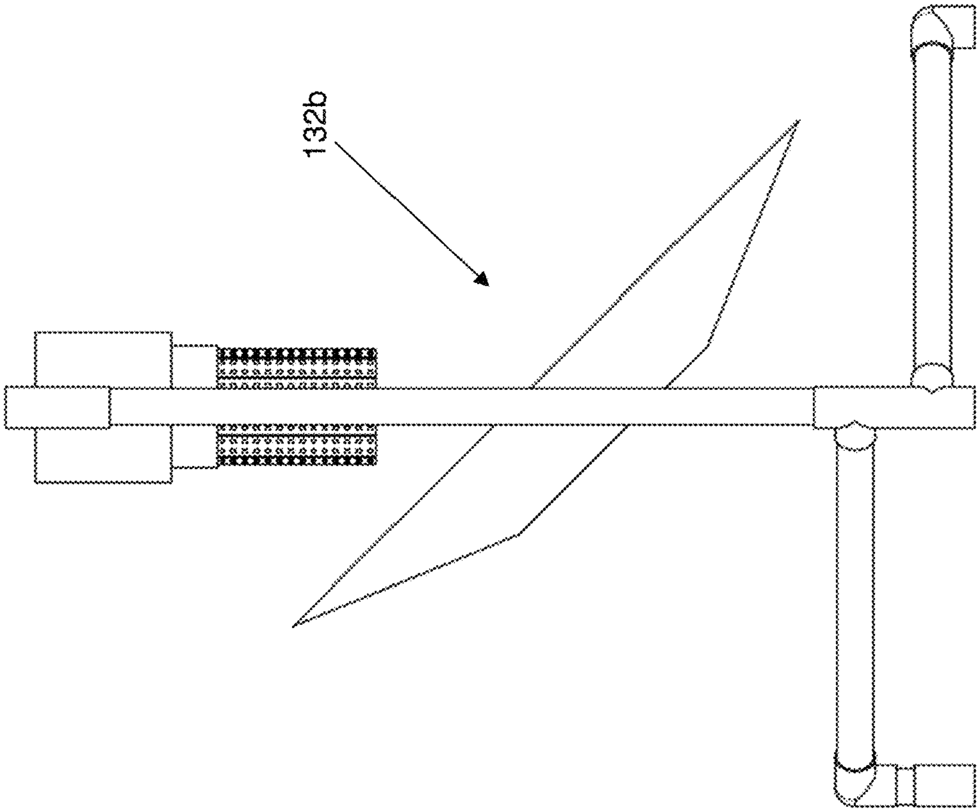
FIGS. 6A-6C show the light stand described herein with a reflector panel between the masts according to an alternative embodiment of the invention described herein.
Figure 6A:
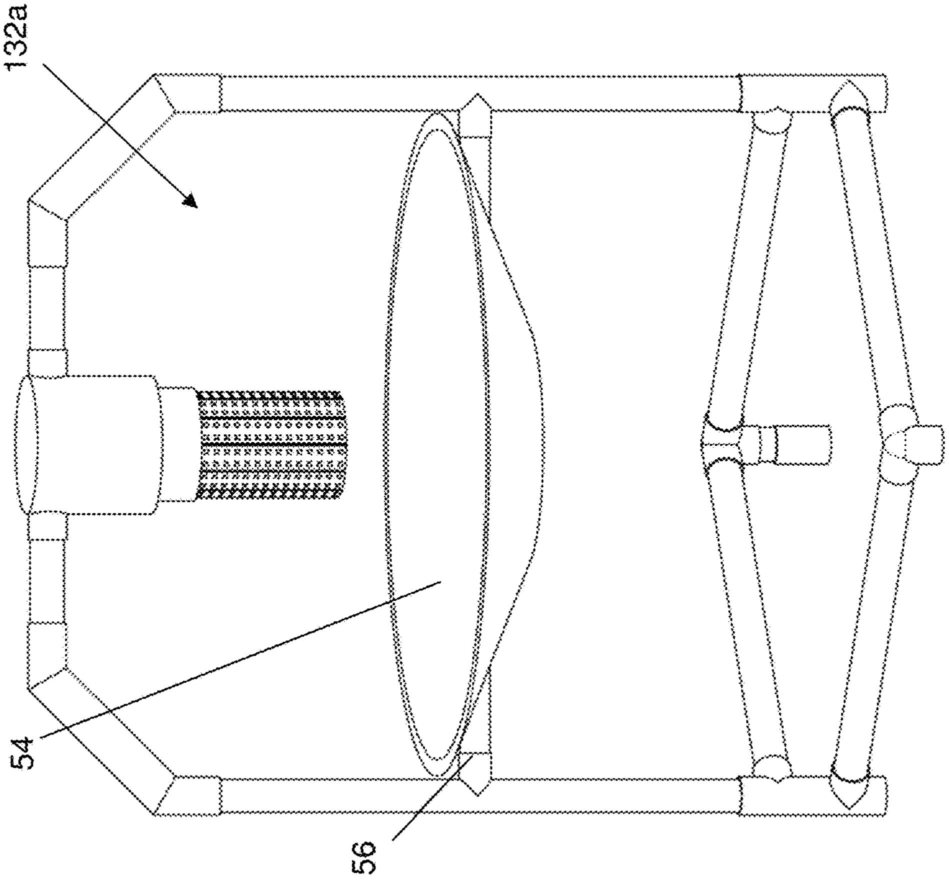
Figure 6C:
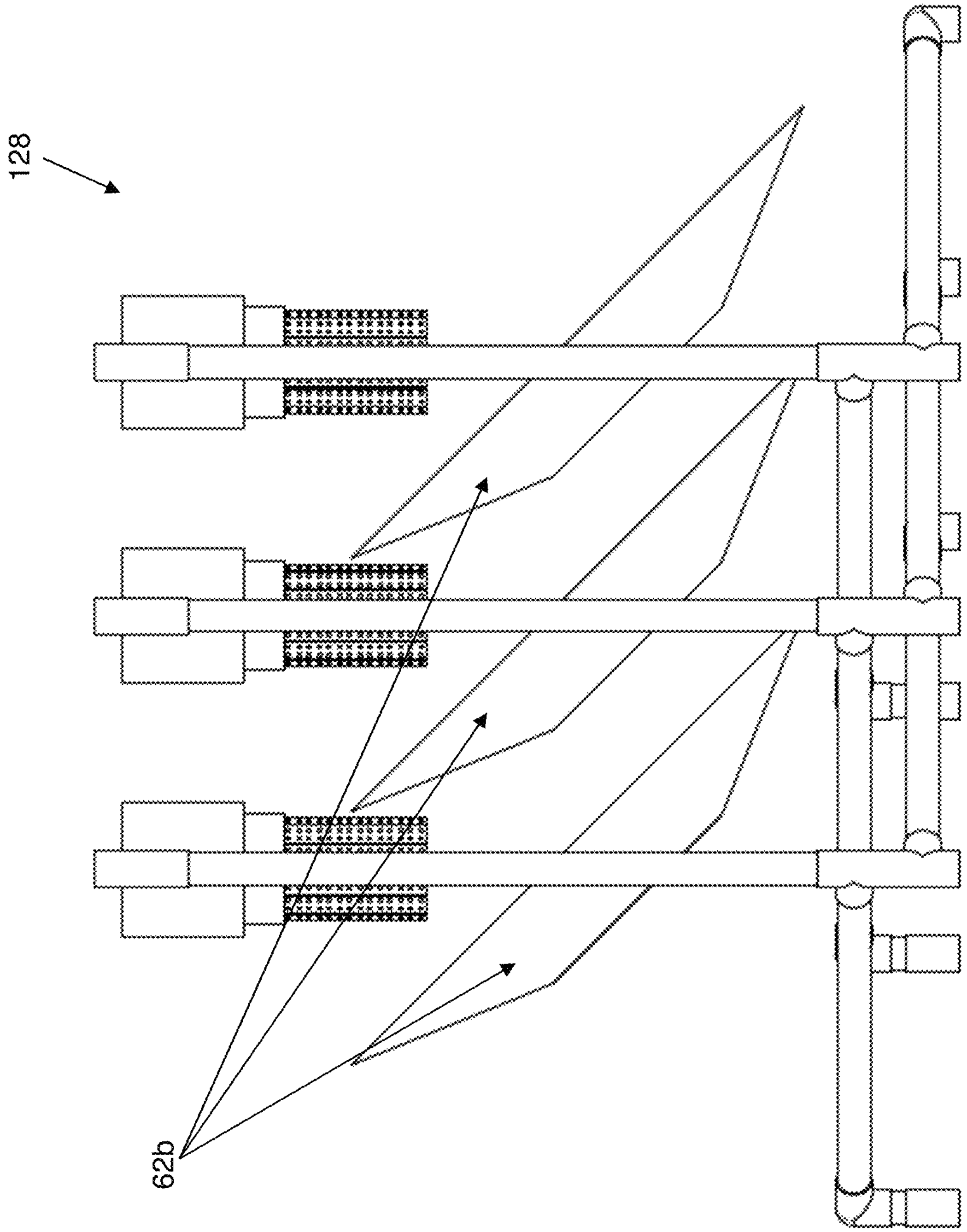

Although outward and downward light may be all that is desired by a user, a reflective panel 54 can be used to direct light upward for embodiments with a suspended light fixture. As shown in FIGS. 6A-6C, an alternative embodiment includes a reflective panel that is attached with a pivot fitting 56 between the opposing masts. The reflective panel includes a top surface with a reflective material and side edges that are connected to the opposing masts with a pivot fitting. In use, the reflective panel can be rotated into a substantially horizontal position 132*a* that is more parallel to the upper and lower horizontal planes than to the vertical plane referenced above. Conversely, when stowed, the reflective panel can be rotated into a substantially vertical position 132*b* that is more parallel to the vertical plane than to the upper and lower planes so the edges of the panel to no interfere with adjacent light fixtures that are nested together. The preferred reflective panel has a concave shape with center point vertically spaced from the midpoint of the beam. However, it will be appreciated that the shape is not intended to be limiting and various other shapes could be incorporated into the invention described herein.

Figure 7B:
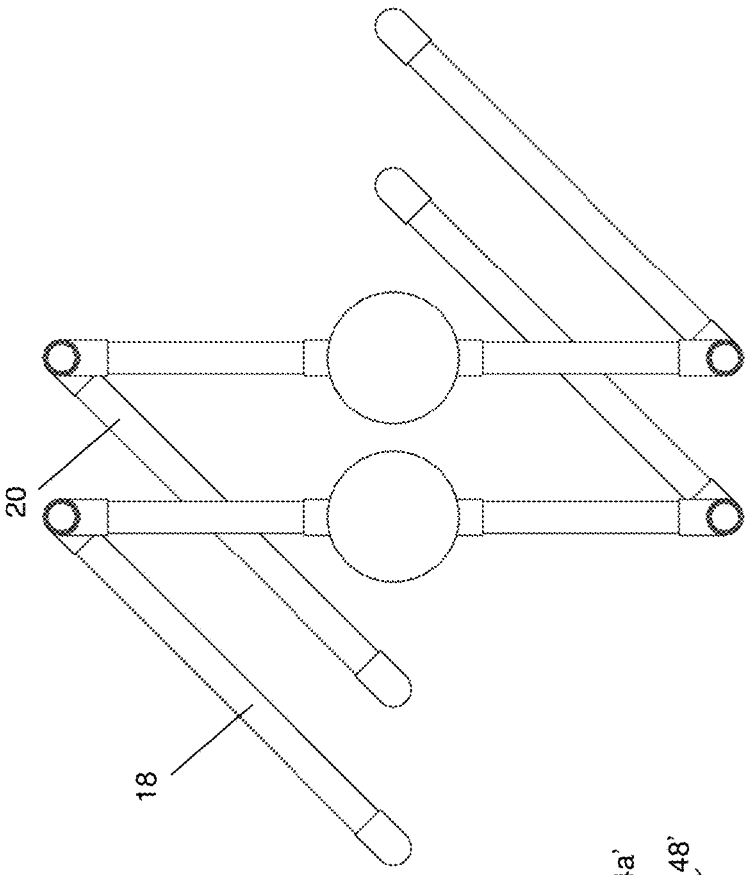
FIGS. 7A and 7B show the light stand according to the invention described herein with an alternative base design.
Figure 7A:
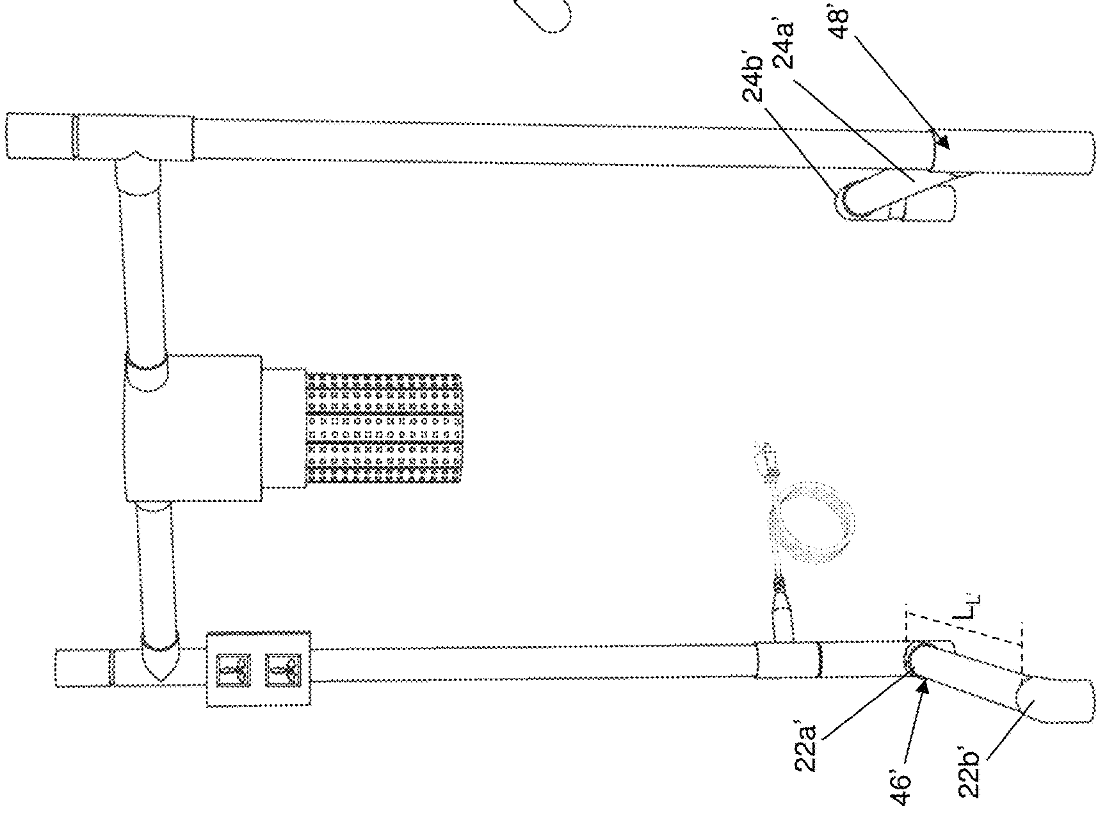

Another alternative light stand can include a base with legs that are only attached to the masts at one end, such as shown in FIGS. 7A and 7B. In this embodiment one end of each leg connects to one of the masts and the length of the leg are angled outwardly from the vertical plane in which the masts sit, without connecting to the opposite mast like the legs in the preferred embodiment. This design provides additional clearance for the base of adjacent light stands when they are moved into the nested position and further requires less material. However, this design is not preferred because it does not provide as much stability or rigidity to the stand in comparison to the preferred base configuration discussed above.

The base and frame are preferably constructed from light weight tubular materials, such as PVC, but may also be made from wood, metal or other similar materials without departing from the invention as described herein. Tubular subparts are preferred because they allow the fixture to be modular with connectors used to attach various subparts to one another without the need for external fasteners. Furthermore, quick connects allow users to interchange individual subparts without disassembling the entire stand, such as changing the light fixture from the preferred suspended fixture to an upward facing fixture described below. However, more traditional fasteners, such as bolts and screws, may be used to more securely attach the skeletal structure of the frame together in place of or in combination with quick release tubular fasteners.

The stand is designed to be light weight for easy lifting while also being deployable without any setup or adjustment procedure after initial assembly. Once assembled, the user need only move the light stand into the desired area, plug the power cord into a power supply and turn on the light fixture. When the light stand is no longer needed, the user can quickly pickup and move the light stand into another area or back into storage.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A light stand, comprising:

a base comprising a first leg and a second leg, wherein the first leg and the second leg each comprise a first end and a second end spaced a first length, wherein at least a portion of the first leg is situated within a first plane, wherein at least a portion of the second leg is situated within a second plane, and wherein the first plane is vertically spaced an offset height above the second plane;

a frame comprising a first mast and a second mast and a beam, wherein the first mast and the second mast each comprises a top end and a bottom end vertically spaced a mast height, wherein the beam comprises a pair of opposing beam ends horizontally spaced a beam width, wherein the first end of the first leg connects to the first mast at a first location proximate to the corresponding bottom end, wherein the first end of the second leg connects to the second mast at a second location proximate to the corresponding bottom end, wherein one end of the beam connects to the first mast at a third location proximate to the corresponding top end, and wherein the other end of the beam connects to the second mast at a fourth location proximate to the corresponding top end; and a light fixture comprising a housing, a socket and a bulb, wherein the housing is fixedly connected to the beam between the pair of opposing ends, wherein the socket is situated within the housing, and wherein the bulb is releasably received within the socket.

2. The light stand of claim 1, wherein the first leg and the second leg each further comprise a first section, a second section and a bend between the first section and the second section, wherein the first section extends from the first end to the bend, wherein the second section extends from the second end to the bend, wherein the second end of the first leg connects to the second mast at a fifth location proximate to the corresponding bottom end, wherein the second end of the second leg connects to the first mast at a sixth location proximate to the corresponding bottom end, wherein the first location is vertically offset a first distance from the sixth location, wherein the second location is vertically offset a second distance from the fifth location, and wherein the first distance and the second distance are equal to the offset height.

3. The light stand of claim 1, wherein the base further comprises a foot connected to the first leg, wherein the foot protrudes a first foot height from a fixed end connected the first leg and a free end disconnected from the first leg, and wherein the first height is at least as great as the offset height.

4. The light stand of claim 3, wherein the base further comprises another foot protruding a second foot height from a respective fixed end connected to the second leg to a respective free end disconnected from the second leg, wherein the second foot height is less than the first foot height, and wherein the free end of the foot, the respective free end of the other foot and the bottom ends of the first mast and the second mast are positioned within a third plane vertically spaced the second foot height beneath the second plane.

5. The light stand of claim 1, wherein at least one of the first mast and the second mast further comprise a hook, wherein the hook is positioned between the top end of the corresponding mast and the corresponding third location and fourth location and comprises a neck and a nose, and wherein the neck extends a neck length from one of the third location and the fourth location on the corresponding mast to the nose.

6. The light stand of claim 1, wherein the socket housing further comprises an external flange surrounding the socket, wherein the external flange extends a flange length between a proximal edge and a distal edge, and wherein the bulb is received within the socket and at least partially surrounded by the external flange.

7. The light stand of claim 1, wherein the first mast, the second mast and the beam frame are at least partially positioned within a vertical plane orthogonal to the first plane and the second plane, and wherein the bulb is suspended from the socket within the housing beneath the beam and at least partially positioned within the vertical plane.

8. The light stand of claim 1 further comprising a handle, wherein the housing of the light fixture further comprises a fixture width between a pair of opposing housing ends, wherein the fixture width is less than the beam width, wherein the housing ends are respectively positioned proximate to one of the beam ends, wherein the handle comprises a handle width between one of the opposing housing ends and the proximate opposing beam end, and wherein the handle width is at least as great as the fixture width.

9. The light stand of claim 1, wherein at least one of the first mast and the second mast further comprise a receptacle box housing an outlet, wherein the receptacle box comprises a body surrounding an interior volume and an outer perimeter surrounding an opening to the interior volume, wherein body is fixedly connected to the corresponding mast at a receptacle location positioned between the corresponding top end and the corresponding bottom end, wherein the interior volume of the body is at least partially within the corresponding mast, wherein the outer perimeter protrudes from the body, and wherein the outlet is secured within the interior volume of the body.

10. The light stand of claim 9 further comprising a power supply positioned within one of the first mast and the second mast at an inlet location proximate to the corresponding bottom end, wherein the power supply comprises an inlet aperture within the corresponding mast and a power cord comprising an external plug protruding from the inlet and an internal wire extending into the inlet, wherein the first mast, the second mast and the beam each collectively comprise a cable passageway within each of the first mast, the second mast and the beam, and wherein the internal wire extends from the inlet through the cable passageway and electrically connects the power supply, the outlet and the light fixture to one another.

11. The light stand of claim 1, wherein the light stand is positioned adjacent to another light stand in a nested configuration, wherein the other light stand comprises another base having another first leg and another second leg, and wherein the first leg of the light stand overlaps the second leg of the other night stand in the nested configuration.

12. A light stand, comprising:

a base comprising a first leg and a second leg, wherein the first leg and the second leg each comprise a first end and a second end spaced a first length, wherein at least a portion of the first leg is situated within a first plane, wherein at least a portion of the second leg is situated within a second plane, and wherein the first plane is vertically spaced an offset height above the second plane;

a frame comprising a first mast and a second mast and a beam, wherein the first mast and the second mast each comprises a top end and a bottom end vertically spaced a mast height, wherein the beam comprises a pair of opposing beam ends horizontally spaced a beam width, wherein the first end and the second end of the first leg respectively connect to the first mast and the second mast at corresponding first leg mounting locations proximate to the bottom end of the corresponding masts, wherein the first end and the second end of the second leg respectively connect to the first mast and the second mast at corresponding second leg mounting locations proximate to the bottom end of the corresponding masts, wherein the opposing ends of the beam respectively connect to the first mast and the second mast at corresponding beam mounting locations proximate to the top end of the corresponding masts, wherein first leg mounting locations are positioned within the first plane, and wherein the second leg mounting locations are positioned within the second plane;

a light fixture comprising a housing, a socket and a bulb, wherein the housing is fixedly connected to the beam between the pair of opposing ends and comprises a fixture width between a pair of opposing housing ends, wherein the fixture width is less than the beam width, wherein the housing ends are respectively positioned proximate to one of the beam ends, wherein the socket is situated within the housing, and wherein the bulb is releasably received within the socket; and a handle within the beam, wherein the handle comprises a handle width between one of the opposing housing ends and the proximate opposing beam end, and wherein the handle width is at least as great as the fixture width.

13. The light stand of claim 12, wherein the base further comprises a foot connected to the first leg and at least one other foot connected to the second leg, wherein the foot protrudes a first foot height from a fixed end connected the first leg and a free end disconnected from the first leg, wherein the first height is at least as great as the offset height, wherein the other foot protrudes a second foot height from a respective fixed end connected to the second leg to a respective free end disconnected from the second leg, wherein the second foot height is less than the first foot height, and wherein the free end of the foot, the respective free end of the other foot and the bottom ends of the first mast and the second mast are positioned within a third plane vertically spaced the second foot height beneath the second plane.

14. The light stand of claim 1, wherein at least one of the first mast and the second mast further comprise a hook and a receptacle box housing an outlet, wherein the hook is positioned between the top end of the corresponding mast and the corresponding beam mounting location and comprises a neck and a nose, wherein the neck extends a neck length from the corresponding beam mounting location to the nose, wherein the receptacle box comprises a body surrounding an interior volume and an outer perimeter surrounding an opening to the interior volume, wherein body is fixedly connected to the corresponding mast at a receptacle location positioned between the corresponding first leg mounting location and the corresponding beam mounting location, wherein the interior volume of the body is at least partially within the corresponding mast, wherein the outer perimeter protrudes from the body, and wherein the outlet is secured within the interior volume of the body.

15. The light stand of claim 12 further comprising a power supply positioned within one of the first mast and the second mast at an inlet location proximate to the corresponding bottom end, wherein the power supply comprises an inlet aperture within the corresponding mast and a power cord comprising an external plug protruding from the inlet and an internal wire extending into the inlet, wherein the first mast, the second mast and the beam each collectively comprise a cable passageway within each of the first mast, the second mast and the beam, and wherein the internal wire extends from the inlet through the cable passageway and electrically connects the power supply, the outlet and the light fixture to one another.

16. The light stand of claim 12, wherein the housing further comprises an external flange surrounding the socket, wherein the external flange extends a flange length between a proximal edge and a distal edge, wherein the bulb is received within the socket and at least partially surrounded by the external flange, wherein the first mast, the second mast and the beam frame are at least partially positioned within a vertical plane orthogonal to the first plane and the second plane, and the bulb is suspended from the socket within the housing beneath the beam and at least partially positioned within the vertical plane.

17. A light stand, comprising:

a base comprising a first leg and a second leg, wherein the first leg and the second leg each comprise a first end and a second end spaced a first length, wherein at least a portion of the first leg is situated within a first plane, wherein at least a portion of the second leg is situated within a second plane, and wherein the first plane is vertically spaced an offset height above the second plane;

a frame comprising a first mast and a second mast and a beam, wherein the first mast and the second mast each comprises a top end and a bottom end vertically spaced a mast height, wherein the beam comprises a pair of opposing beam ends horizontally spaced a beam width, wherein the first end and the second end of the first leg respectively connect to the first mast and the second mast at corresponding first leg mounting locations proximate to the bottom end of the corresponding masts, wherein the first end and the second end of the second leg respectively connect to the first mast and the second mast at corresponding second leg mounting locations proximate to the bottom end of the corresponding masts, wherein the opposing ends of the beam respectively connect to the first mast and the second mast at corresponding beam mounting locations proximate to the top end of the corresponding masts, wherein first leg mounting locations are positioned within the first plane, and wherein the second leg mounting locations are positioned within the second plane;

a light fixture comprising a housing, a socket and a bulb, wherein the housing is fixedly connected to the beam between the pair of opposing ends and comprises a fixture width between a pair of opposing housing ends, wherein the fixture width is less than the beam width, wherein the housing ends are respectively positioned proximate to one of the beam ends, wherein the socket is situated within the housing, and wherein the bulb is releasably received within the socket; and a receptacle box housing an outlet, wherein the receptacle box comprises a body surrounding an interior volume and an outer perimeter surrounding an opening to the interior volume, wherein body is fixedly connected to the corresponding mast at a receptacle location positioned between the corresponding first leg mounting location and the corresponding beam mounting location, wherein the interior volume of the body is at least partially within the corresponding mast, wherein the outer perimeter protrudes from the body, and wherein the outlet is secured within the interior volume of the body.

18. The light stand of claim 17 further comprising a power supply positioned within one of the first mast and the second mast at an inlet location proximate to the corresponding bottom end, wherein the power supply comprises an inlet aperture within the corresponding mast and a power cord comprising an external plug protruding from the inlet and an internal wire extending into the inlet, wherein the first mast, the second mast and the beam each collectively comprise a cable passageway within each of the first mast, the second mast and the beam, and wherein the internal wire extends from the inlet through the cable passageway and electrically connects the power supply, the outlet and the light fixture to one another.

19. The light stand of claim 17, wherein the base further comprises a foot connected to the first leg and at least one other foot connected to the second leg, wherein the foot protrudes a first foot height from a fixed end connected the first leg and a free end disconnected from the first leg, wherein the first height is at least as great as the offset height, wherein the other foot protrudes a second foot height from a respective fixed end connected to the second leg to a respective free end disconnected from the second leg, wherein the second foot height is less than the first foot height, and wherein the free end of the foot, the respective free end of the other foot and the bottom ends of the first mast and the second mast are positioned within a third plane vertically spaced the second foot height beneath the second plane.

20. The light stand of claim 17 further comprising a handle and a hook, wherein the handle is positioned within the beam and comprises a handle width between one of the opposing housing ends and the proximate opposing beam end, wherein the handle width is at least as great as the fixture width, wherein the hook is positioned on at least one of the first mast and the second mast between the top end of the corresponding mast and the corresponding beam mounting location and comprises a neck and a nose, and wherein the neck extends a neck length from the corresponding beam mounting location to the nose.

* * * * *